(12) United States Patent
Webber et al.

(10) Patent No.: US 9,232,470 B2
(45) Date of Patent: Jan. 5, 2016

(54) POWER SUPPLY CIRCUIT FOR MOBILE TELECOMMUNICATIONS DEVICES

(71) Applicant: CYLON GLOBAL TECHNOLOGY INC., Nassau, New Providence (BS)

(72) Inventors: Glenn Webber, New Providence (BS); Eamonn Courtney, New Providence (BS); Jacqueline Cole-Courtney, New Providence (BS)

(73) Assignee: Cylon Global Technology Inc., Nassau (BS)

( * ) Notice: Subject to any disclaimer, the term of this patent is extended or adjusted under 35 U.S.C. 154(b) by 0 days.

(21) Appl. No.: 14/262,106

(22) Filed: Apr. 25, 2014

(65) Prior Publication Data

US 2015/0065205 A1 Mar. 5, 2015

(30) Foreign Application Priority Data

Aug. 30, 2013 (GB) .................................. 1315571.8

(51) Int. Cl.
*H04W 52/02* (2009.01)
*H04B 1/16* (2006.01)
*H04W 48/16* (2009.01)

(52) U.S. Cl.
CPC ......... *H04W 52/0209* (2013.01); *H04B 1/1607* (2013.01); *H04W 48/16* (2013.01)

(58) Field of Classification Search
USPC ........ 455/550.1, 571, 573, 574, 575.1, 127.1, 455/343.1
See application file for complete search history.

(56) References Cited

U.S. PATENT DOCUMENTS

| | | | |
|---|---|---|---|
| 5,054,115 A * | 10/1991 | Sawa et al. ..................... | 455/571 |
| 5,524,044 A * | 6/1996 | Takeda .......................... | 455/571 |
| 5,847,553 A | 12/1998 | Beaudoin et al. | |
| 5,890,077 A * | 3/1999 | Hanawa et al. ............ | 455/127.1 |
| 7,702,369 B1 | 4/2010 | Wright | |
| 2006/0264188 A1 | 11/2006 | Mars et al. | |
| 2008/0223925 A1 | 9/2008 | Saito et al. | |
| 2011/0263294 A1 | 10/2011 | Kim et al. | |
| 2012/0106103 A1 | 5/2012 | Nohra | |
| 2012/0217811 A1 | 8/2012 | Marien | |

FOREIGN PATENT DOCUMENTS

| | | |
|---|---|---|
| CN | 102420452 | 4/2012 |
| CN | 102545612 | 7/2012 |

(Continued)

OTHER PUBLICATIONS

Combined Search and Examination Report under Sections 17 and 18(3) dated Jan. 24, 2014 for United Kingdom Patent Application No. GB1315571.8, filed Aug. 30, 2013.

(Continued)

*Primary Examiner* — Thanh Le
(74) *Attorney, Agent, or Firm* — Knobbe, Martens, Olson & Bear, LLP

(57) ABSTRACT

A power supply circuit for the modem of a mobile telecommunications device comprises a battery, a modem status detection circuit for detecting whether the modem is in communication with a base station or is searching for a base station, a current or voltage booster, and a switching circuit controlled by the detection circuit for switching the current or voltage booster into and out of operation such that the booster provides additional current to the modem when it is searching for a base station.

16 Claims, 2 Drawing Sheets

(56) References Cited

FOREIGN PATENT DOCUMENTS

| JP | 2001-217741 A | 8/2001 |
|---|---|---|
| WO | WO 03/007538 A1 | 1/2003 |

OTHER PUBLICATIONS

Examination Report dated Jul. 7, 2015 for United Kingdom Patent Application No. GB1315571.8 filed on Aug. 30, 2013.

* cited by examiner

POWER SUPPLY CIRCUIT FOR MOBILE TELECOMMUNICATIONS DEVICES

INTRODUCTION

This invention relates to a power supply circuit for a modem, such as a GSM modem, of a mobile telecommunications device such as a mobile telephone, particularly a cell phone.

BACKGROUND

As is well known, cellphones communicate by radiolink with an infrastructure of base stations positioned at locations distributed around the geographical area within which the cellphone network operates.

When a cell phone is first powered up, or when it moves from one cell to another, it has to search for a base station. The current, or power, which the modem of the cell phone uses whilst searching for a base station is greater than that used after it has logged itself on to a base station. The battery that is used therefore has to be sufficiently highly rated to provide for the higher level of power or current which is needed during the searching process. As a result, the physical size of the battery must be sufficiently great to enable the battery to deliver the required higher levels of power or current and to have a sufficiently long life (i.e. time between rechargings) to enable it to be practical.

SUMMARY OF THE INVENTION

In one aspect, the invention provides a cellular telecommunications device comprising a modem and a power supply circuit, said power supply circuit including a current booster which is rendered operable in response to the modem searching for a base station and inoperable when the modem is in communication with a base station, so that additional current is supplied to the modem when searching for a base station.

In another aspect, the invention provides identity verification device comprising a biometric sensor and a cellular telecommunications device as defined in the preceding paragraph, the verification device being operable for performing identity verification operations utilising the biometric sensor in response to receipt of a verification command via a cellular telecommunications network.

In a further aspect, the invention provides a cellular telecommunications device comprising a modem and a power supply circuit, said power supply circuit including terminals for connection to a battery, a modem status detection circuit for detecting whether the modem is in communication with a base station or is searching for a base station, a current or voltage booster, and a switching circuit controlled by the detection circuit for switching the current or voltage booster into and out of operation such that the booster provides additional current to the modem when it is searching for a base station.

DETAILED DESCRIPTION OF EMBODIMENT

Figure 1:
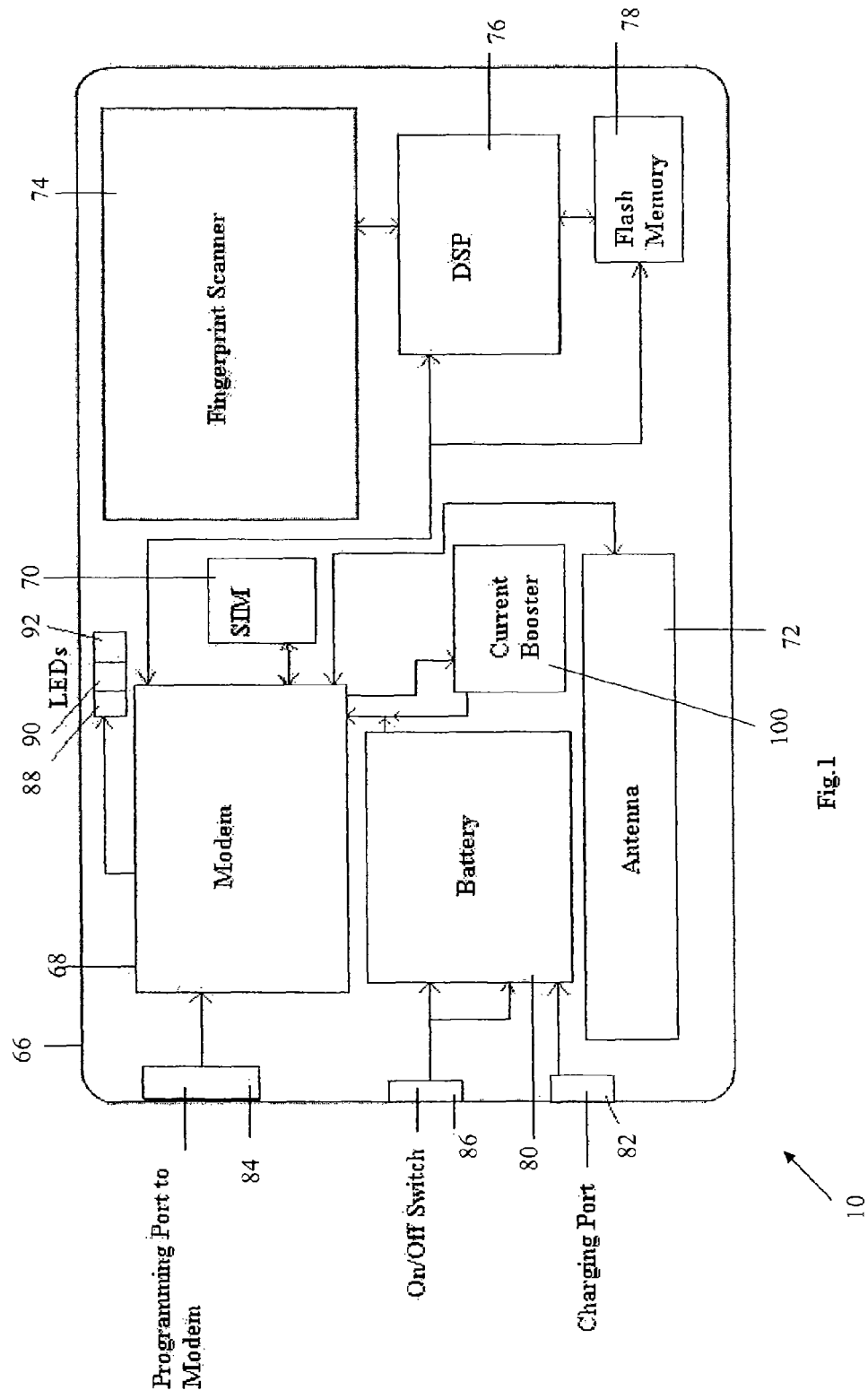
Figure 2:
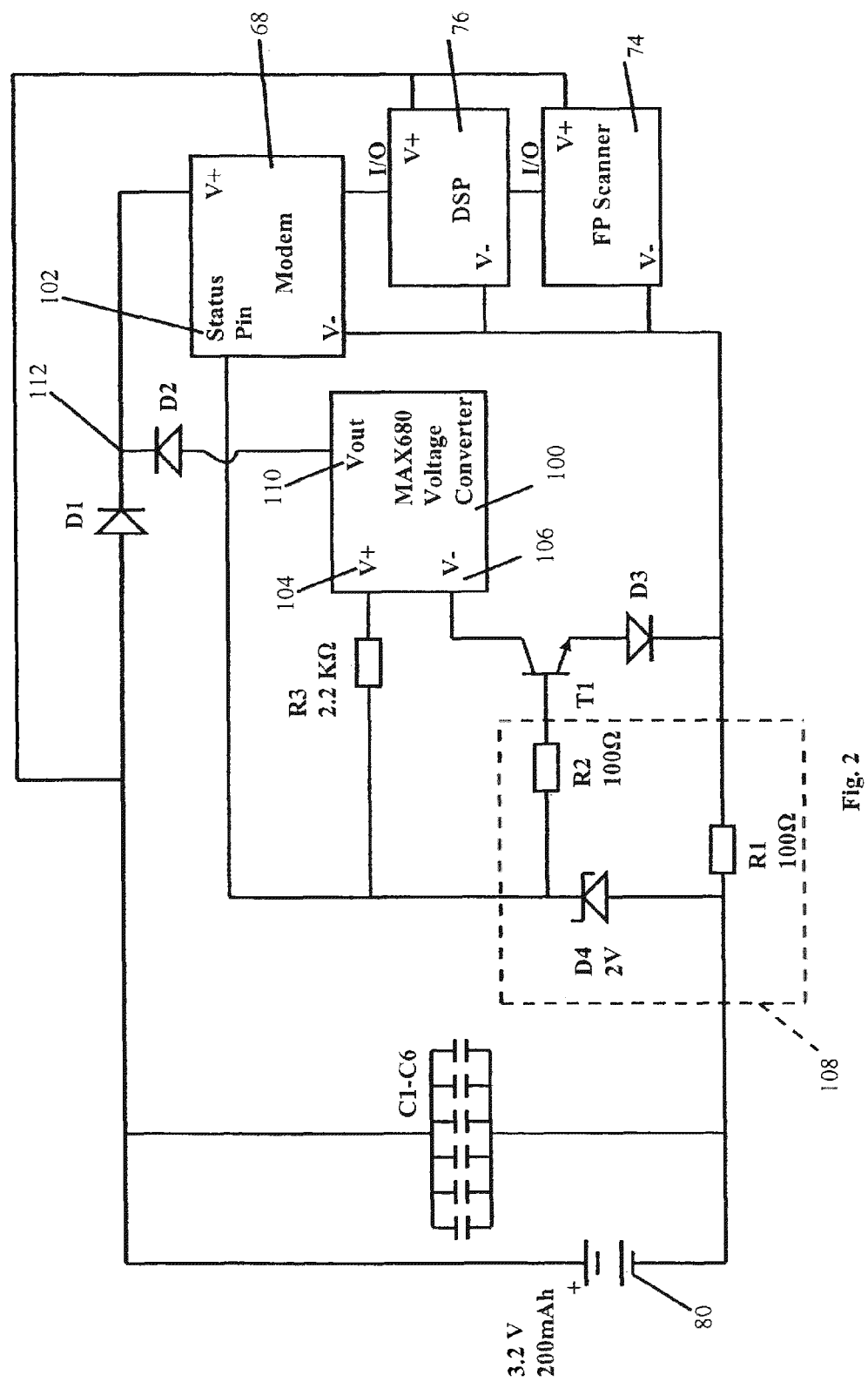

The invention is described in detail by way of example with reference to the accompanying drawings, in which:

FIG. 1 is a block diagram of the main components of a verification device according to a first embodiment of the invention, constructed in the form of a card incorporating a fingerprint reader; and FIG. 2 is a circuit diagram of a current booster circuit which is included in the card shown in FIG. 1.

OVERVIEW

FIG. 1 shows a verification device 10 which is for verifying the identity of individuals by one or more of their fingerprints in a verification process which is initiated by instructions received by the device 10 wirelessly over a mobile telephone (cellphone) network.

The device 10 may be used for verification of the identity of an individual in any of a large number of different circumstances, including on occasions when the individual wishes to initiate or instruct the performance of any of a variety of electronic transactions. Examples of such transactions are financial transactions, transactions providing access to buildings or areas by electronically controlled gates or barriers, transactions providing access to physical storage locations or rooms, transactions providing access to electronically stored data and transactions for turning on or off any kind of electrical or electrically controlled apparatus, machinery or system. However, the nature of the transaction forms no part of the present invention.

Structure and Components of Verification Device

As shown in FIG. 1, the verification device 10 comprises a rectangular substrate 66, in the form of a card, upon which are mounted a mobile telephone (cellphone) modem 68 and an associated subscriber identity module (SIM) 70 and antenna 72, a fingerprint scanner 74, a digital signal processor 76 for processing signals from the fingerprint scanner, a flash memory unit 78 for storing relevant data, for example fingerprint templates, a current booster unit 100 for boosting current available to the modem 68 under conditions to be described later, and a rechargeable battery 80 for powering the modem 68, SIM card 70, fingerprint scanner 74, digital signal processor 76 and flash memory unit 78. As is conventional, the SIM 70 will have a unique telephone number.

A charging port 82, constituted by a conventional electrical connector, is mounted on the substrate 66 at one end thereof and connected to the battery 80 for connecting the battery to a power source, such as rectified mains, for charging the battery.

The substrate 66 also supports a manually operable on/off switch 86 for connecting the battery to, and disconnecting it from, the components that it powers, and three light sources, preferably light emitting diodes (LEDs), 88, 90 and 92 for indicating respectively three different statuses of the device. Thus, LED 88 may be illuminated to indicate that a process requiring the reading of the fingerprint is to take place and the user of the card should therefore place his/her appropriate finger on the fingerprint scanner 74. The LED 90 may be illuminated to indicate that the process has been successful and the LED 92 may be illuminated to indicate that the process has been unsuccessful. Preferably, the LEDs 88, 90 and 92 are of different colours, which are preferably blue, green and red respectively.

The substrate 66 may be constructed of material conventionally used for credit cards and the like, for example a suitable synthetic plastics material, and the components 68 to 92 mounted on it are preferably constructed and arranged so that the dimensions and shape of the device 10 as a whole are such that it can be readily carried in a wallet along with conventional credit cards.

Thus, it is preferable that the dimensions and shape are as close as practicable to the size and shape of a conventional credit card. By way of example, the dimensions of the device 10 (i.e. the substrate 66 together with the components 68 to 92) may be approximately, for example, 85 mm×54 mm×3.5 mm. Other dimensions are possible. To achieve these dimensions, all of the components supported on the substrate may be constructed to be as flat (thin) as possible or practicable i.e. the dimensions of each component in a direction normal to the plane of the substrate 66 should be as small as possible or practicable and they should be positioned and arranged on the substrate 66 so as to achieve the required overall thickness of the device 10.

To enable the device to be set up to provide the required functionality, a programming port 84 in the form of an electrical connector, is also mounted on the substrate 66 at one end thereof and connected to the modem for supplying to the modem computer executable code for programming it, in particular for loading into the modem computer executable instructions which program the modem as necessary to enable it to respond to instructions transmitted to it in use of the card. The technical details by which this may be achieved do not form part of the present invention.

Such instructions may be transmitted to device 10 via a cellphone network, for example by text (SMS) message. The means by which such text messages might be generated and transmitted to the device 10 do not form part of the present invention, nor do the processes which are executed by the device 10 in response to such instructions. However, typically, the device 10 may be operable to respond to a small number of specific commands, such as for enrolling the user, removing a user, verifying the identity of the user or storing data on the device 10.

In particular, the modem 68 may be programmed so that, upon receipt of a command for verifying the identity of the user, the modem 68 sends an instruction to the DSP 76 to execute a fingerprint matching process utilising the fingerprint scanner 74 to determine whether fingerprint data are derived from a finger applied to the scanner 74 matches previously stored fingerprint data derived during an enrolment process, thereby to verify (or otherwise) the identity of the user. In response to a successful verification of the identity of a user, the modem 68 may be arranged to transmit a response message, for example by text (SMS) message, via the cellular telecommunications network, to a remote device or apparatus, such as a server, for example the remote device or apparatus from which the verify command originated.

Power Supply Circuit and Current Booster

As shown in FIG. 2, the positive terminal of the battery 80 is connected through a diode D1 to the positive power supply terminal V+ of each of the modem 68, the DSP 76 and the fingerprint scanner 74. The negative power supply terminal V− and of each of these devices is connected to the negative terminal of the battery 80 via resistor R1. A bank of 100 µF smoothing capacitors C1 to C6 is connected across the battery, the capacitors C1 to C6 being in parallel with each other.

As explained above, the verification device 10 is, in this embodiment, constructed as a slim card which can easily be carried in a wallet. As a result, there is limited space available for the battery. A battery of suitable physical size may therefore be rated at 3.2 V or 3.5V and 200 mA hour.

The smaller the physical size of the battery, the less capacity it has and the smaller the magnitude of the current that it can supply. Thus, whilst such a small battery may be of supplying sufficient current to the modem 68 during periods when the modem is in communication with a base station, it may be incapable of supplying sufficient current thereto when the modem is searching for a base station. Thus, in the present embodiment, as shown in FIG. 2, a current booster 100 is included and is arranged so that it is switched into operation when the modem is searching for a base station and is otherwise switched off.

Conventional GSM or cell phone modems such as modem 68 are provided with a status pin, indicated at 102 in FIG. 2 which are at a relatively high voltage, typically about 3V, when the modem is already in communication with a base station, but the voltage of the status pin drops, typically to approximately 2 volts when the modem is searching for a base station. Conventionally, the voltage on the status pin is used to activate an indicator on the cell phone display to indicate whether or not the modem is in communication with a base station.

In the circuit of FIG. 2, the voltage on the status pin 102 is used for two purposes. Firstly, it is used for switching the current booster into and out of operation. Secondly, it is used to provide an input voltage to the current booster 100 from which additional current is generated for supply to the modem 68 when it is searching for a base station.

Thus, current booster circuit 100 has its positive power input terminal 104 connected through resistor R3 to the status pin 102 and its negative power input terminal 106 connected via NPN transistor T1 to ground through a diode D3. The transistor T1 acts as a switch so that the current booster 100 is powered down (switched off) when the status pin voltage is high, but is powered up (switched on) when the status pin voltage is low. For this purpose, a voltage sensing circuit 108 senses the voltage on the status pin 102 and turns the transistor T1 on or off accordingly.

As can be seen in FIG. 2, the sensing circuit includes a resistor R2 through which the status pin 102 is connected to the base of transistor T1, and the Zener diode D4 in series with a resistor R1 through which the status pin 102 is connected to ground. The breakdown voltage of the Zener diode D4 is approximately 2V so that when the status pin voltage is high the Zener diode D4 conducts and the NPN transistor T1 is turned off. When the status pin voltage goes low the Zener diode D4 ceases to conduct and current flows into the base of the NPN transistor T1 from the status pin causing the NPN transistor T1 to be turned on.

When the transistor T1 turns on, power is supplied to the power input terminals 104 and 106 of the current booster 100 which then supplies current from its output terminal 110 through diode D2 to the V+ input terminal of the modem 68. The currents through the diodes D1 and D2 are summed at junction 112.

Thus, when the modem 68 is already in communication with a base station and requires a relatively low level of current to power it, this is supplied from the battery 80 via diode D1. When the modem 68 is searching for a base station and requires additional current, this is supplied from the current booster 100 via the diode D2.

The current booster circuit 100 may be a conventional voltage converter operable to approximately double an applied input voltage, such as MAX 680, as indicated in FIG. 2. Thus, in the circuit as shown in FIG. 2, when the current booster circuit 100 is turned on it produces, from the approximate 2 volts applied to it from the status pin 102, a voltage of approximately 4 V which in turn provides the additional current supplied to the modem 68 through the diode D2.

Examples of suitable values for the various resistors in the circuit of FIG. 2 are shown in the drawing. However, other values may be possible. Further, although FIG. 2 shows the details of a particular circuit for providing this additional current, other circuits are possible. Thus, the invention extends to different forms of circuit which, in response to the modem 68 being in a condition in which it is searching for a base station, supplies additional current to the modem 68.

The invention thus makes it possible to use a small battery of low rating for powering the modem 68 and other circuitry on the device 10.

Further, although in the embodiment described and illustrated in the accompanying drawings the invention is shown as applied to a verification device in the form of a card, it may alternatively be applied to any device utilising a modem for communication with a mobile telephone or cell phone network, particularly where the device is such that it is desirable to employ a battery which is a small as possible. Examples of such other devices are mobile telephones themselves.

Further, although one particular circuit in accordance with the invention has been illustrated in FIG. 2, other forms of circuit are possible, particularly any circuit comprising a battery, a modem status detection circuit for detecting whether the modem is in communication with a base station or is searching for a base station, a current or voltage booster, and a switching circuit controlled by the detection circuit for switching the current or voltage booster into and out of operation such that the booster provides additional current to the modem when it is searching for a base station.

Although the embodiment of the invention described with reference to the drawings incorporates a fingerprint scanner for verifying the identity of the user, alternative embodiments of the invention may employ other forms of biometric sensor, such as an iris sensor.

From the foregoing description, it will be appreciated that one feature of the invention is a power supply circuit for a modem which enables a battery of smaller physical size, and therefore rating, to be used than has previously been possible.

Another feature of the invention is a power supply circuit for a modem which includes a current or voltage booster which is on when the modem is searching for a base station and is off when the modem is not searching for a base station.

A further feature of the invention is that a mobile communication device may be constructed as a small card similar to the size of a conventional credit card which includes a battery-powered modem and a voltage doubler circuit which operates to provide additional current to the modem when the modem is searching for a base station.

Thus, the invention is particularly applicable to the powering of a modem that is provided on a small, slim card shaped device for verifying the identity of individuals biometrically in which instructions for initiating the verification process are transmitted to the device wirelessly via a telecommunications network. Such a device would require the battery which powers the device to be as small as possible. The biometric verification may be of any of number of different types, including verification by fingerprint.

The invention claimed is:

1. A cellular telecommunications device comprising:
   a modem; and
   a power supply circuit, said power supply circuit including a current booster which is rendered operable in response to the modem searching for a base station and inoperable when the modem is in communication with a base station, so that additional current is supplied to the modem when searching for a base station,
   wherein the modem has a status contact whose voltage changes dependent upon whether the modem is searching for or is in communication with a base station, and
   wherein the cellular telecommunications device includes a sensing circuit operable to sense the voltage on the status contact and to render the current booster operable or inoperable dependent upon the sensed voltage.

2. A device according to claim 1, in which the current booster is powered from the status contact.

3. A device according to claim 1 or 2, in which the current booster comprises a voltage converter.

4. An identity verification device comprising:
   a biometric sensor; and
   a cellular telecommunications device, the cellular telecommunications device comprising a modem and a power supply circuit, said power supply circuit including a current booster which is rendered operable in response to the modem searching for a base station and inoperable when the modem is in communication with a base station, so that additional current is supplied to the modem when searching for a base station, the verification device being operable for performing identity verification operations utilizing the biometric sensor in response to receipt of a verification command via a cellular telecommunications network.

5. An identification verification device according to claim 4, in which the modem has a status contact whose voltage changes dependent upon whether the modem is searching for or is in communication with a base station, and
   wherein the identification verification device includes a sensing circuit operable to sense the voltage on the status contact and to render the current booster operable or inoperable dependent upon the sensed voltage.

6. An identification verification device according to claim 5, in which the current booster is powered from the status contact.

7. An identification verification device according to claim 4, in which the current booster comprises a voltage converter.

8. An identification verification device according to claim 4, wherein the biometric sensor is a fingerprint reader.

9. An identification verification device according to claim 4 including a digital signal processor coupled to the biometric sensor for processing signals therefrom, the modem being operable to activate the digital signal processor for the performance of a biometric scan in response to receipt of the verification command.

10. An identification verification device according to claim 4 operable for receiving said verification command in an SMS text message.

11. An identification verification device according to claim 4, operable in response to a successful verification operation to transmit a response message to said cellular telecommunications network.

12. An identification verification device according to claim 11, operable to transmit an SMS text message including said response.

13. An identification verification device according to claim 4, constructed in the form of a card.

14. An identification verification device according to claim 13, in which the dimensions of the card are no more than 100 mm+60 mm×5 mm.

15. An identification verification device according to claim 13 in which the dimensions of the card are 85 mm×54 mm×3.5 mm.

16. An identification verification device according to claim 13 including a battery for powering the verification device, said battery having a rating of approximately 3.2 V or 3.5 V and 200 mA hours.

* * * * *